United States Patent
Wang

(10) Patent No.: US 7,467,570 B2
(45) Date of Patent: Dec. 23, 2008

(54) SLIDER MEMBER FOR AUTOMATIC TRANSMISSION SHIFTERS

(75) Inventor: Yong Qiang Wang, Rochester Hills, MI (US)

(73) Assignee: DURA GLOBAL Technologies, Inc., Rochester Hills, MI (US)

( * ) Notice: Subject to any disclaimer, the term of this patent is extended or adjusted under 35 U.S.C. 154(b) by 632 days.

(21) Appl. No.: 11/042,593

(22) Filed: Jan. 25, 2005

(65) Prior Publication Data

US 2006/0196298 A1    Sep. 7, 2006

(51) Int. Cl.
*G05G 1/00* (2006.01)
(52) U.S. Cl. ....................................... 74/566
(58) Field of Classification Search .............. 74/473.13, 74/473.14, 473.15, 473.3, 473.34, 523, 524, 74/525, 528, 566; 116/28.1, 29
See application file for complete search history.

(56) References Cited

U.S. PATENT DOCUMENTS

| 5,622,086 | A | * | 4/1997 | Suzuki et al. ................. 74/566 |
| 5,848,855 | A | | 12/1998 | Roossien |
| 5,862,708 | A | * | 1/1999 | Shamoto ................. 74/473.18 |
| 6,443,031 | B1 | | 9/2002 | Kim |
| 6,520,043 | B1 | | 2/2003 | Wang |

* cited by examiner

*Primary Examiner*—Vicky A Johnson
(74) *Attorney, Agent, or Firm*—Kevin S. MacKenzie; Gifford, Krass, Sprinkle, Anderson & Citkowski, P.C.; Dean B. Watson

(57) ABSTRACT

A slide cover assembly for an automatic transmission includes a shift lever housing having a track formed therein. The track includes inner and outer surfaces. A slide member having opposing lateral edges is received within the track and extends from the inner to the outer surface of the track. The slide member includes a plurality of retention features integrally formed along the opposing lateral edges for maintaining the slide member within the track.

9 Claims, 2 Drawing Sheets

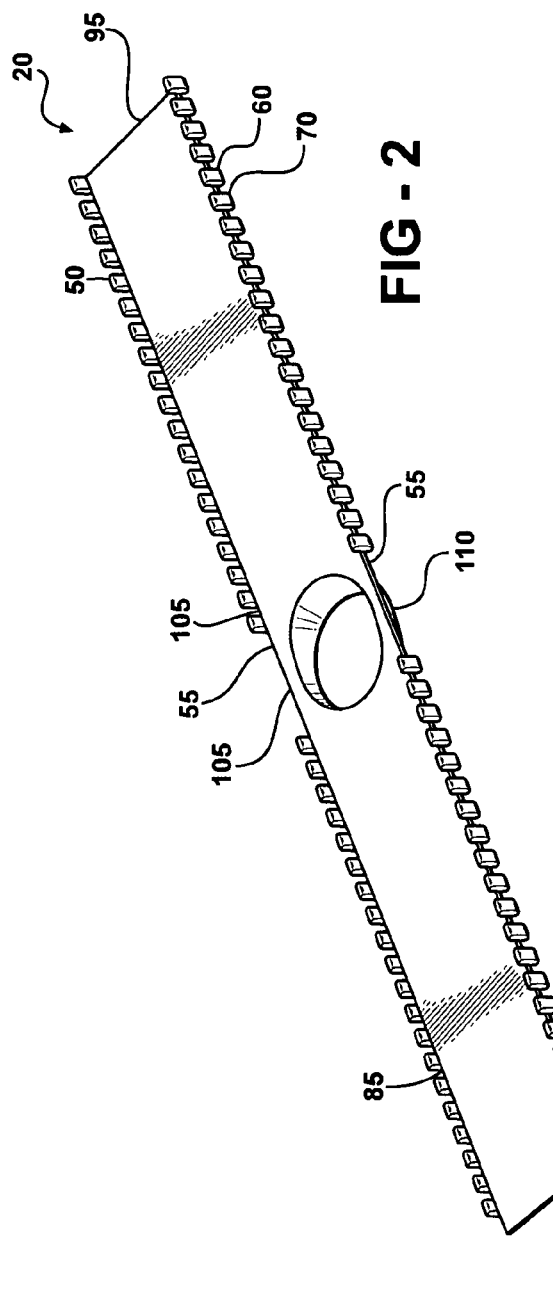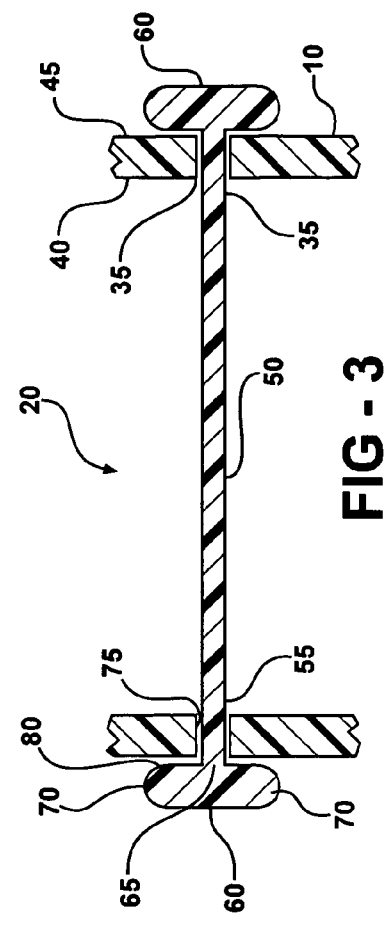

SLIDER MEMBER FOR AUTOMATIC TRANSMISSION SHIFTERS

BACKGROUND OF THE INVENTION

The invention relates to slider members for transmission shifters, and more particularly to slider members for automatic transmission shifters.

Generally, a shift lever assembly for an automatic transmission includes an indicator cover or panel having a slot formed therein. A shift lever passes through the slot and moves along the slot to various positions corresponding to various positions of the automatic transmission.

Typically the slot includes a slide cover to cover the slot such that the internal mechanism of the shift lever cannot be seen by an occupant of the vehicle. Also, the slide cover protects the shift lever assembly from the introduction of foreign materials.

Typically, the slide cover is received within a sliding track or slot for movement corresponding to adjustment of a shift lever. The slide cover should have material properties to minimize sliding friction during a shift operation. However, the slide cover must also have strength properties such that the cover stays within the sliding track when a perpendicular push-out force is applied to it.

In an effort to solve the above problems, prior art slider covers have included strength ribs applied to a back side of the slide cover to increase the strength of the cover; thereby, providing resistance to a push-out force, as outlined above. However, the introduction of strengthening ribs to a back side of the cover commonly results in defects on the top side of the cover visible to an occupant of a vehicle.

There is therefore a need in the art for a slide cover that resists a push-out force and has a smooth defect-free top surface.

SUMMARY OF THE INVENTION

A slide cover assembly for an automatic transmission includes a shift lever housing having a track formed therein. The track includes inner and outer surfaces. A slide member having opposing lateral edges is received within the track and extends from the inner to the outer surface of the track. The slide member includes a plurality of retention features integrally formed along the opposing lateral edges for maintaining the slide member within the track.

BRIEF DESCRIPTION OF THE DRAWINGS

FIG. 2 is a perspective view of a slide member of the present invention; and

FIG. 3 is a partial sectional view of a slide member and track according to the present invention.

DETAILED DESCRIPTION OF THE PREFERRED EMBODIMENTS

Figure 1:
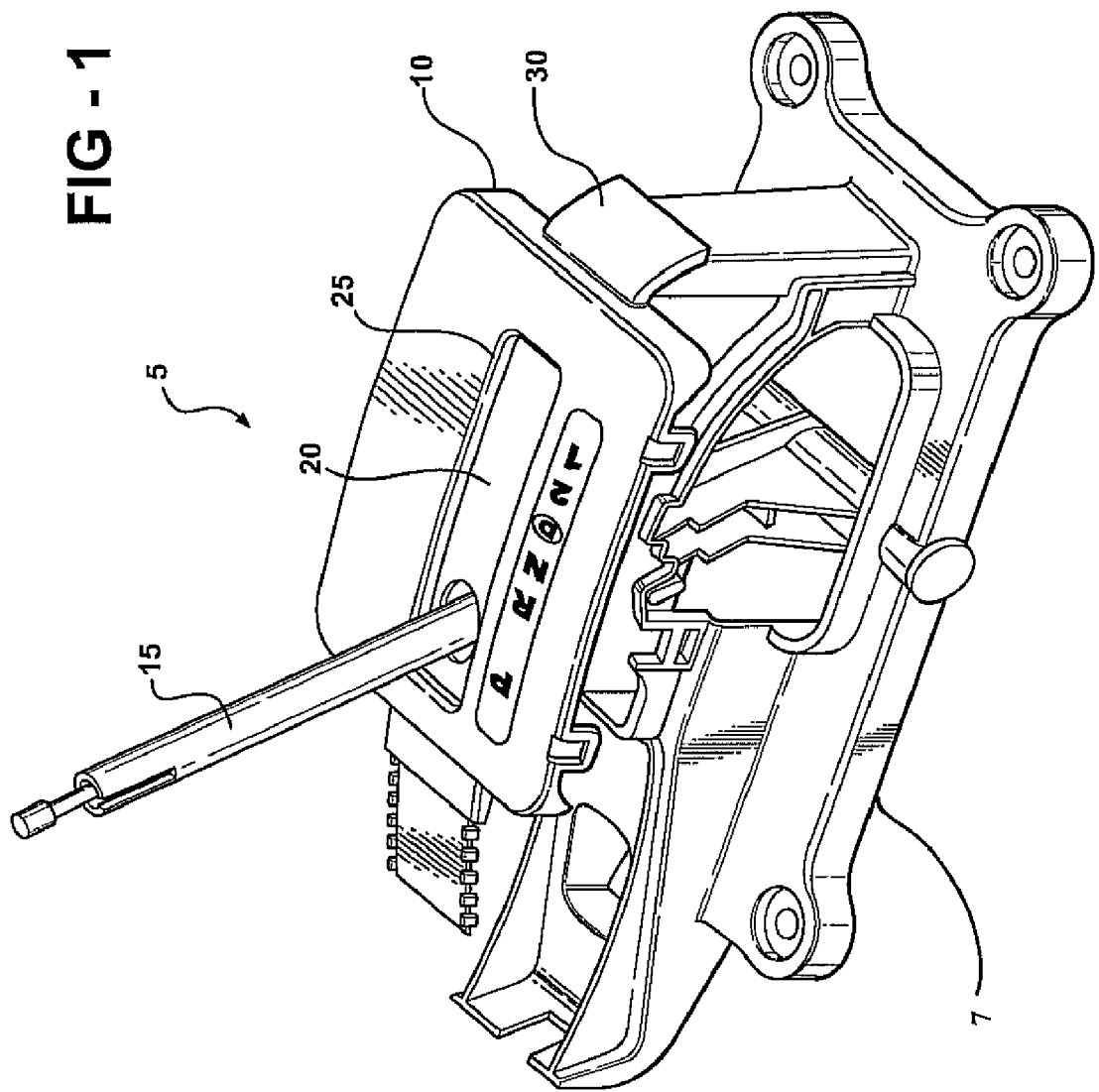
FIG. 1 is a perspective view of a shift lever assembly including the slide cover assembly of the present invention.

Referring to FIG. 1, there is shown a shift lever assembly 5. The shift lever assembly 5 generally includes a base 7 with a housing 10 and a lever 15 projecting from the housing 10. Various arrangements of shift levers 15 and housings 10 are known in the art and may utilize the slide cover assembly 20 of the present invention. As can be seen in FIG. 1, the housing 10 generally includes a slot 25 into which a slide cover assembly 20 is positioned to move along the slot 25 and prevent an occupant of a vehicle viewing the internal portion of the shift assembly 5. The slide cover assembly 20 is generally stowed in a receiving portion 30 of the housing 10, as the slide cover assembly is moved along various positions of the automatic transmission. The slide cover assembly 20 stowed in the receiving portion should therefore be flexible so that it can be retained in the receiving portion 30 of the housing 10.

The slide cover assembly 20 of the present invention includes a housing 10 having a track 35 formed therein, as best seen in FIG. 3. The track 35 preferably includes inner and outer surfaces 40, 45, as best seen in FIG. 3. A slide member 50 having opposing lateral edges 55 is received within the track 35 and extends from the inner 40 to the outer 45 surface of the track 35. The slide member 50 includes a plurality of retention features 60 integrally formed along the opposing lateral edges 55 for maintaining the slide member 50 within the track 35.

Referring to FIG. 3, the plurality of retention features 60 formed on each lateral edge 55 is preferably a minor image of the opposing lateral edge 55; thereby forming opposing pairs of retention features 60. In a preferred aspect of the present invention, each opposing pair of retention features 60 is spaced from an adjacent pair of retention features 60 along the lateral edge 55 to maintain the flexibility of the slide member 50. The spacing of the retention features 60 may also be described with respect to each of the plurality of retention features 60 formed on each lateral edge 55 being spaced from an adjacent retention feature 60 on the same lateral edge 55. The spacing of adjacent retention features 60 allows the slide member 50 to maintain its flexibility allowing it to be easily stored in a retention area, as shown in FIG. 1.

Referring to FIGS. 2 and 3, each of the plurality of retention features 60 includes a middle portion 65 that is integral with the lateral edge 55 of the slide member 50. Outwardly extending legs 70 extend from the middle portion. In a preferred aspect of the present invention, the outwardly extending legs 70 extend perpendicular to the lateral edges 55 of the slide member 50, although other angles and orientations may be used by the present invention.

Referring to FIG. 3, the outwardly extending legs 70 extend for a distance that is greater than an opening size 75 of the track 35. In this manner, the slide member 50 is held within the track 35 against a push-out force applied to the slide member 50. As best seen in FIG. 3, the outwardly extending legs 70 include an inside surface 80 that slidingly engages the outer surface 45 of the track 35 allowing for movement of the slide member 50 while maintaining the slide member 50 within the track 35.

Referring to FIG. 2, the slide member 50 includes top and bottom surfaces 85, 90 as well as front 95 and rear 100 edges and the lateral edges 55 previously described above. In a preferred aspect of the present invention, the top surface 85 is free from defects and may either be smooth or have a grain surface according to a desired design. A slot 105 is formed in the slide member 50 for receiving the shift lever 15. The slot 105 may include a raised peripheral region 110 to accommodate the shift lever 15 and to allow for the shift lever 15 to move the slide member 50 without damage to the slide member 50. The raised peripheral region 110 will generally act as a force distribution element preventing all the force from being applied to an edge of the slot 105 formed in the slide member 50.

In use, the slide member 50 is positioned within the track 35 such that the lateral edges 55 of the slide member 50 are received in the track 35 and extend from an inner surface 40 of the track 35 toward an outer surface 45 of the track 35. The retention features 60 include an inside surface 80 that slidably engages the outer surface 45 of the track 35. As the shift lever 15 is moved from any of its positions, the motion is transferred to the slide member 50 via the slot 105 formed in the slide member 50. In this manner, the plurality of retention features 60 travel along the track 35 maintaining the slide member 50 within the track 35.

As the slide member 50 is moved within the track 35, it may be stored or removed from the receiving portion 30 formed in the housing 10. The spacing between the retention features 60 allows for the slide member 50 to maintain its flexibility and be easily stored in the receiving portion 30.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A slide cover assembly comprising:
a shift lever housing having a track famed therein, the track including inner and outer surfaces and the track having an opening;
a slide member having opposing lateral edges received within the track opening and extending from the inner to the outer surface of the track, the slide member having a plurality of retention features integrally formed along the opposing lateral edges, the retention features extending for a distance greater than the size of the opening for maintaining the slide member laterally within the track.

2. The slide cover assembly of claim 1 wherein the plurality of retention features on each lateral edge is a mirror image of the opposing lateral edge forming opposing pairs of retention features.

3. The slide cover assembly of claim 2 wherein each opposing pair of retention features is spaced from an adjacent pair of retention features for maintaining a flexibility of the slide member.

4. The slide cover assembly of claim 1 wherein each of the plurality of retention features comprises a middle portion integral with the lateral edge of the slide member and outwardly extending legs extending from the middle portion.

5. The slide cover assembly of claim 4 wherein the outwardly extending legs extend perpendicular to the lateral edges of the slide member.

6. The slide cover assembly of claim 1 wherein the outwardly extending legs include an inside surface that slidingly engages the outer surface of the track.

7. The slide cover assembly of claim 1 wherein the slide member includes a slot formed therein for receiving a shift lever.

8. A slide cover assembly comprising:
a shift lever housing having a track formed therein, the track including inner and outer surfaces and the track having an opening;
a slide member having opposing lateral edges received within the track opening and extending from the inner to the outer surface of the tack, the slide member having a plurality of retention features integrally formed along the opposing lateral edges the retention features extending for a distance greater than the size of the opening for laterally retaining the slide member within the track and wherein each of the plurality of retention features formed on each lateral edge is spaced from an adjacent retention feature for maintaining a flexibility of the slide member.

9. A shifter assembly comprising:
a base;
a slide member; and
a slide cover assembly associated with the base, the slide cover assembly including a shift lever housing having a track, the track including inner and outer surfaces and an opening, the slide member received within the track opening, and wherein the slide member includes a plurality of retention features on opposing sides of the slide member the retention features extending for a distance greater than the size of the opening for laterally maintaining the slide member within the track.

* * * * *